May 19, 1959 C. KARABATS 2,887,605

CERAMIC SPACE-DISCHARGE TUBE

Filed April 16, 1956

Christopher Karabats

*INVENTOR*

United States Patent Office 2,887,605
Patented May 19, 1959

2,887,605

CERAMIC SPACE-DISCHARGE TUBE

Christopher Karabats, Lexington, Mass., assignor, by mesne assignments, to Sanders Associates, Inc., Nashua, N.H., a corporation of Delaware Application April 16, 1956, Serial No. 578,210
4 Claims. (Cl. 313—244)

This invention relates to modular devices for electronics. More particularly, the invention relates to modular, space-discharge tubes.

In the construction of modular packaging for electronic components as described in National Bureau of Standards Technical News Bulletin Number 11, volume 37, November 1953, it has been a problem to provide compatible space-discharge tubes. As described and illustrated in NBS Bulletin Number 11, such modules are typically formed of a plurality of congruently stacked, spaced, ceramic wafers having perimetrically disposed indentations formed therein. The wafers have metallic conductive paths affixed thereto and are supported in place by riser wires or conductors disposed in the wafer indentations. The indentations are coated with conductive material which is caused to adhere to the riser wires as, for example, by soldering or brazing.

The conductive paths and indentation coatings are formed from silver painted or printed on the wafer in a desired configuration. Where the modules are designed for high temperature applications or where, as in modular space-discharge tubes, ceramic-to-metal seals are required, a severe problem of breakage is introduced in brazing the riser wires to the indentations. Highly concentrated "hot-spots" are generated in the ceramic wafer in the area of the indentations.

In the prior art, space-discharge tubes, particularly electron-discharge tubes, are formed primarily from glass envelopes and metal or phenolic bases. The electrodes typically are vertically supported by metallic conductors which extend from the base of the tube. Such tubes do not operate satisfactorily at temperatures in excess of 185° C. Furthermore, these tubes are extremely susceptible to mechanical shock and vibration. Additionally, these tubes are not readily integrated into modular units.

It is, therefore, an object of the invention to provide an improved modular, space-discharge tube operable at temperatures in excess of 600° C.

A further object of the invention is to provide an improved modular, space-discharge tube capable of withstanding a high degree of mechanical shock and vibration.

A still further object of the invention is to provide an improved modular, electron-discharge tube having reliable and low resistance riser connections.

In accordance with the present invention there is provided a module which comprises a plurality of congruently stacked ceramic wafers adapted to carry electrical components. The wafers have perimetrically disposed indentations for effecting external riser connections. Metallic conductive paths are affixed to the wafers. Riser connection tabs are provided which have a curved member individually inserted in different ones of the indentations and a flat element contacting one of the connection paths whereby riser conductors may be connected to the curved members without applying excessive heat to the wafers. There are also provided a plurality of riser conductors disposed in the indentations and connected to the tabs to provide external connections.

For a better understanding of the present invention, together with other and further objects thereof, reference is made to the following description taken in connection with the accompanying drawing and its scope will be pointed out in the appended claims.

Figures 1, 2, 3, 4, 5:
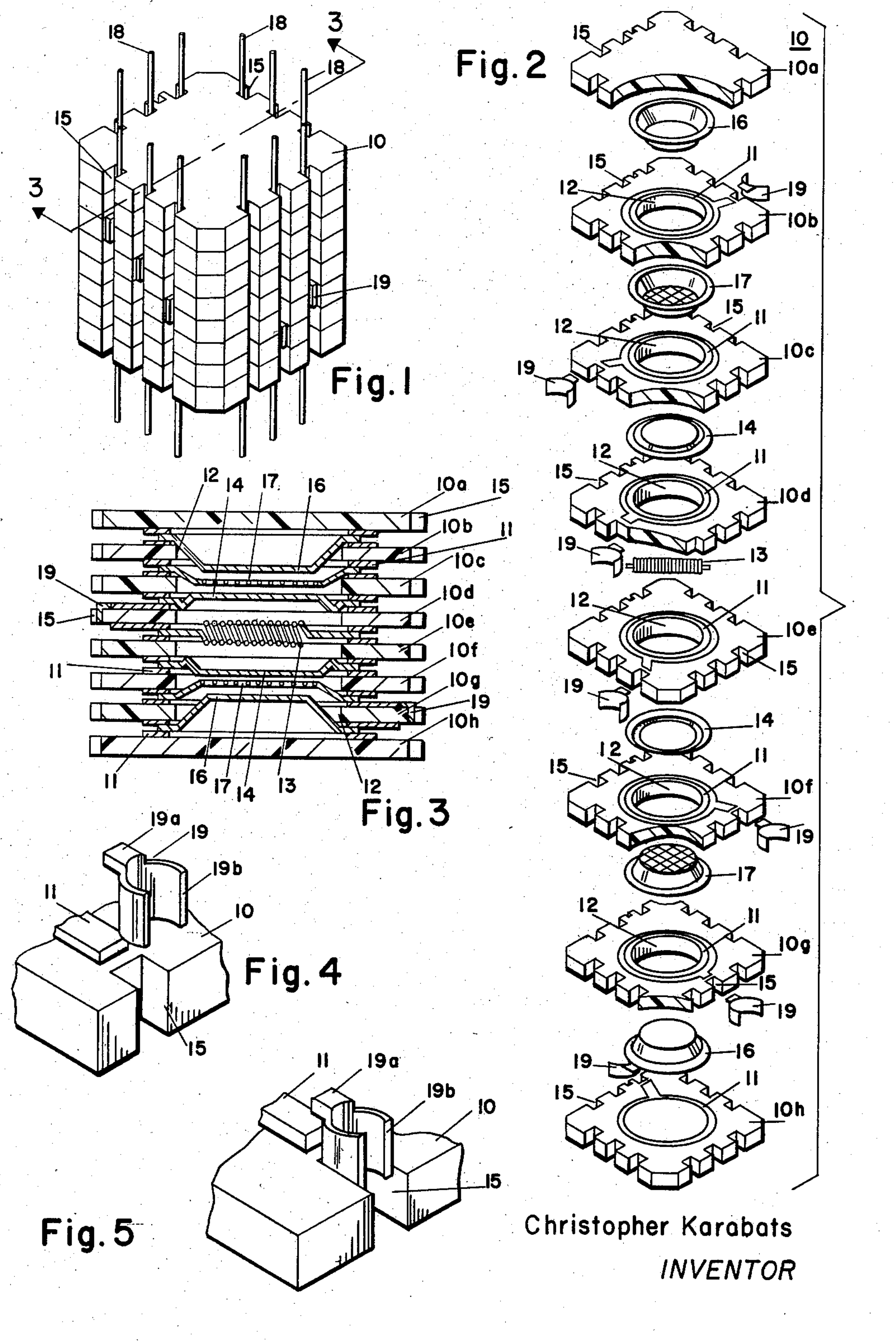
Fig. 1 is a perspective view of an electron-discharge tube embodying the invention.
Fig. 2 is a perspective view, in exploded form and partially in section, of an electron-discharge tube embodying the invention.
Fig. 3 is a sectional view of the embodiment in Fig. 1.
Fig. 4 is a detailed view of a fragment of a module wafer illustrating an aspect of the invention.
Fig. 5 is a perspective detailed view of a fragment of a module wafer illustrating a further aspect of the invention.

*Description of the discharge tube in Figs. 1–5*

Referring now to the drawings, there is here illustrated a modular, space-discharge tube. While the embodiment illustrated and described herein is particularly directed to an electron-discharge tube, the term "space-discharge tube" is employed to include both vacuum and gas discharge tubes in which either negative or positively charged particles are transmitted through space. The electron-discharge tube here illustrated is a twin-triode having a heater 13, a pair of cathodes 14, a pair of control grids 17, and a pair of anodes 16 contained within and supported by a plurality of congruently stacked, ceramic wafers 10. Thus, in detail, and referring particularly to Fig. 2, the tube comprises a plurality of congruently stacked, ceramic wafers 10*a*—10*h*, each having a metallic conductive path 11 affixed thereto. The inner wafers 10*b*—10*g*, inclusive, have circular holes 12 centrally formed therein. The end wafers 10*a* and 10*h* enclose the ends of the tube and seal the discharge space formed by the holes 12. The heater element 13, disposed at approximately midpoint axially and diametrically of the holes 12, is secured between the middle pair of adjacent wafers 10*d* and 10*e*. The cathodes 14, in the form of a pair of disks, are individually secured between different ones of the pairs of wafers 10*c*, 10*d* and 10*e*, 10*f*. In a manner similar to that of the cathodes, the control grids 17 in the form of perforated saucer-like disks are secured between different ones of the pairs of wafers 10*b*, 10*c* and 10*f*, 10*g*. The anodes 16 are disposed between end wafers and the adjacent inner wafers, one between the wafers 10*a* and 10*b* and the other between the wafers 10*g* and 10*h*. The electrodes are flanged to enable peripheral securing between pairs of wafers in contact with a conductive path 11 on each of these wafers to provide means for making external connections to the electrodes and are shaped, as shown, to provide a suitable spacing between electrodes.

The wafers have perimetrically disposed indentations 15 to provide means for external connections. The conductive paths 11 are terminated in and connected to selected indentations 15 for effecting a desired matrix of connections. In each of the indentations 15 a riser connection tab 19 is secured. The tabs 19 have a flat element 19*a* adapted to contact a connection path 11 and a curved member 19*b* adapted to be secured in place upon insertion in one of the indentations 15. The tabs 19 are formed from a resilient metal such as beryllium copper. As shown, particularly in Figs. 4 and 5, the flat element 19*a* is perpendicular to the curved member 19*b.* Before insertion into the indentation, the curved member 19*b* is expanded relative to the width of the indentation 15. The member 19*b* is forced into the indentation 15 and exerts pressure against the side walls to secure the tab in place. A plurality of riser conductors 18 are then affixed to the tabs 19 as, for example, by soldering or welding to provide external connections for the tube. The heat of welding or soldering is now dissipated via the relatively large heat conductive surface area of the member 19*b* to preclude excessive "hot-spots" and prevent breakage of the wafers 10.

The tube is assembled by effecting ceramic-to-metal seals between the wafers and the electrodes. Such ceramic-to-metal seals are well know; for example, see "Materials Technology for Electron Tubes" by Walter H. Kohl, published by Reinhold Publishing Corporation, 1951, chapter 16, pages 403–421. The tube being of modular form may also be mounted as an extended portion of a module with common riser connections being made to the module and the modular tube.

One form of the ceramic tube embodying the present invention is .875" square and .28" in height. The volume of a twin-triode embodying the present invention can be less than .12 cubic inch as compared with 6 cubic inches for standard receiving tubes. Such a tube, however, is capable of operating at temperatures in excess of 600° C. as compared with the conventional limitation to 185° C. Furthermore, tubes embodying the present invention are capable of dissipating in excess of 8 watts of power as compared with conventional tubes which are limited to 1 watt.

While applicant does not intend to be limited to any particular shapes, sizes or materials of parts in the embodiment of the invention just described, there follows a set of dimensions and materials for the more important parts which have been found to be particularly suitable for a twin-triode amplifier tube of the type represented by Figs. 1 and 2:

Heater 13—.75" long by .026" in diameter, formed from .002" tungsten wire with .002" aluminum oxide insulation;

Cathodes 14—outer diameter of flange .350"; outer diameter of disk .280"; material—nickel base with a coating of .002" barium strontium;

Wafer holes 12—.340" in diameter;

Control grids 17—flange outer diameter .350"; grid outer diameter .280"; diameter of grid mesh .240"; height .035"; material—grid mesh .001" thick nickel; ferrule .002" thick nickel;

Anodes 16—flange outer diameter .410"; flange inner diameter .330"; outer diameter of anode disk .280"; height .055"; material—nickel .005" thick;

Spacing between end wafers and anodes 16—.053";

Anodes 16 to control grids 17 spacing—.018";

Control grid 17 to cathode 14 spacing—.005";

Total thickness of the two cathodes 14 and heater 13 structure—.040"; and Tabs 19—flat element 19*a*—.125" long x .030" wide, formed of .005" beryllium copper; curved member 19*b*—for wafers 10*b*, 10*c*, 10*f* and 10*g* which are .040" thick, the member 19*b* is .025" high x .234" long with expanded radius of curvature .045" and compressed radius of curvature .030"; for wafers 10*d* and 10*e*, which are .020" thick, the height of member 19*b* is .015".

It will be apparent from the above description that while the structure presented by the present invention has more immediate application to electron-discharge tubes, it is suitable for all modular, space-discharge tubes. It will be further apparent from the above description that the discharge tube of the invention fulfills a critical need in an area where other modern devices such as transistors, amplifiers, capacitive amplifiers and conventional discharge tubes are unsuitable.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A module comprising: a plurality of congruently stacked, ceramic wafers adapted to carry electrical components and having perimetrically disposed indentations for effecting external riser connections; metallic conductive paths affixed to said wafers; riser connection tabs each having a resilient, curved member individually inserted in different ones of said indentations and a flat element contacting one of said connection paths, whereby riser conductors may be connected to said curved members without applying excessive heat to said wafers; and a plurality of riser conductors disposed in said indentations and connected to said tabs to provide external connections.

2. A modular, space-discharge tube, comprising: a plurality of congruently stacked, ceramic wafers having perimetrically disposed indentations for effecting external riser connections; metallic conductive paths affixed to said wafers; heater means secured between a pair of adjacent wafers; an electrode disposed adjacent said heater and secured to a wafer and one of said conductive paths; and metallic riser connection tabs, each having a resilient curved member individually secured in place in different ones of said indentations and having a flat element contacting a connection path, whereby riser conductors may be connected to said curved members without applying excessive heat to said wafer.

3. A modular, electron-discharge tube, comprising: a plurality of congruently stacked, ceramic wafers having perimetrically disposed indentations therein and metallic conductive paths affixed thereto; an anode affixed to a wafer contacting one of said paths; a control grid affixed to a wafer adjacent said anode and contacting one of said paths; a heater element secured between a pair of adjacent wafers; a cathode disk secured to a wafer, disposed between said grid and said heater and contacting one of said paths; riser connection tabs each having a spring curved member adapted to be secured in place upon insertion in one of said indentations and a flat element adapted to contact one of said connection paths, whereby riser conductors may be connected to said curved members without applying excessive heat to said wafers; and a plurality of riser conductors disposed in said indentations and connected to said tabs to provide external connections for said electron tube.

4. A modular, electron-discharge tube, comprising: a pair of end ceramic, wafers having perimetrically disposed indentations therein; a plurality of inner, ceramic wafers with perimetrically disposed indentations and stacked congruently with said end wafers, said inner wafers having holes centrally formed therein; a heater element secured between a pair of adjacent inner wafers and disposed in said holes; a pair of cathode disks disposed adjacent opposite sides of said heater and secured to adjacent inner wafers; a pair of control grid electrodes disposed adjacent said cathodes and secured to said inner wafers; a pair of anodes each disposed between an end wafer and its adjacent inner wafer with said control grids between said anodes and cathodes; metallic conductive paths affixed to said wafers and selectively connecting said electrodes and heater to said indentations; riser connection tabs having a spring, curved member adapted to be secured in place upon insertion in one of said indentations and a flat element adapted to contact one of said connection paths, whereby riser conductors may be connected to said curved members without applying excessive heat to said wafers; and a plurality of riser conductors disposed in said indentations and connected to said tabs to provide an integral, multi-unit, modular electron-discharge tube with external connections.

References Cited in the file of this patent

UNITED STATES PATENTS

| | | |
|---|---|---|
| 2,441,792 | Brian | May 18, 1948 |
| 2,459,277 | Halstead | Jan. 18, 1949 |
| 2,460,201 | Trump et al. | Jan. 25, 1949 |
| 2,501,882 | Trump et al. | Mar. 28, 1950 |
| 2,641,725 | Touraton et al. | June 9, 1953 |
| 2,740,067 | Sorg | Mar. 27, 1956 |
| 2,808,528 | Martin | Oct. 1, 1957 |